Figure 1:
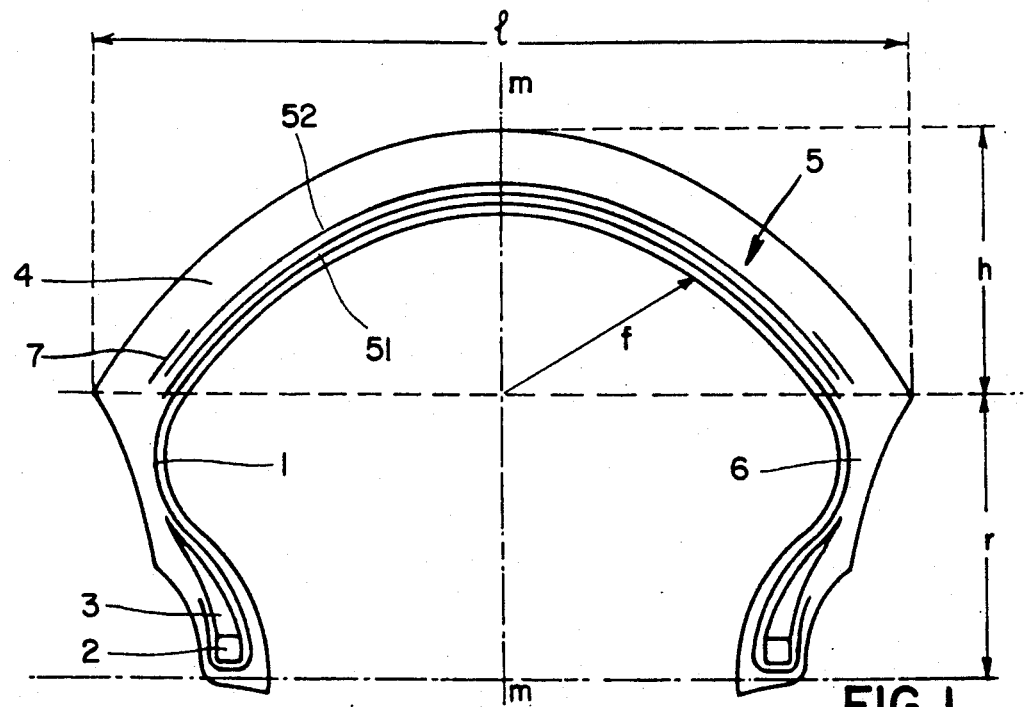

United States Patent [19]

Giancola

[11] Patent Number: 5,109,906
[45] Date of Patent: May 5, 1992

[54] MOTOR-CYCLE TIRE HAVING BELT LAYERS WITH DIFFERENT MODULUS OF ELASTICITIES

[75] Inventor: Guido Giancola, Milan, Italy

[73] Assignee: Pirelli Coordinamento Pneumatici S.p.A., Milan, Italy

[21] Appl. No.: 337,835

[22] Filed: Apr. 14, 1989

[30] Foreign Application Priority Data

Apr. 22, 1988 [JP] Japan .................. 63-20291

[51] Int. Cl.⁵ .............. B60C 9/00; B60C 9/18
[52] U.S. Cl. .................. 152/536; 152/532; 152/534; 152/527
[58] Field of Search .......... 152/536, 534, 527, 454, 152/526, 528, 529, 532

[56] References Cited

U.S. PATENT DOCUMENTS

| | | | |
|---|---|---|---|
| 3,656,533 | 4/1972 | Barassi et al. | 152/534 X |
| 3,690,364 | 9/1972 | Barassi et al. | 152/534 X |
| 3,874,436 | 4/1975 | Hashida et al. | |
| 4,140,168 | 2/1979 | Coretta | 152/527 |
| 4,184,530 | 1/1980 | Mirtain | 152/527 |
| 4,770,222 | 9/1988 | Mezzanotte | 152/555 |

FOREIGN PATENT DOCUMENTS

| | | |
|---|---|---|
| 686400 | 3/1967 | Belgium. |
| 3034364 | 5/1982 | Fed. Rep. of Germany. |
| 2178001 | 11/1973 | France. |
| 2398623 | 2/1979 | France. |
| 2536018 | 5/1984 | France. |
| 56-167504 | 12/1981 | Japan .................. 152/536 |
| 125406 | 5/1988 | Japan .................. 152/526 |

*Primary Examiner*—Michael W. Ball
*Assistant Examiner*—Gregory J. Wilber
*Attorney, Agent, or Firm*—Stevens, Davis, Miller & Mosher

[57] ABSTRACT

A tire for a motorcycle having an arcuate shaped cross-section with a height to width ratio between 0.20 and 0.35 and a carcass reinforcing structure having first and second strips. The first strip is made up of mutually parallel cords having a thickness not exceeding 80 cords/dm at an angle between 22° and 35° to the equatorial plane. The second (radial outer) strip also has mutually parallel cords but these cords, as compared with those of the first strip, have less thickness, a lower elasticity modulus and are at an angle between 18° and 30° and in the opposite sense with respect to the tire equatorial plane.

9 Claims, 1 Drawing Sheet

MOTOR-CYCLE TIRE HAVING BELT LAYERS WITH DIFFERENT MODULUS OF ELASTICITIES

SUMMARY

This invention relates to a tire particularly suitable for motor-cycles having a textile carcass, preferably of radial type, and a belt structure on the carcass top, comprising a strip of reinforcing cords in a radially inner position, said cords being inclined with respect to the circumferential direction of the tire according to an angle ranging between 22° and 35° and, in a radially outer position, a second strip of reinforcing cords, made of material with a modulus lower than that of the cords of the underlying strip, crossed with the cords of the underlying strip and inclined according to an angle ranging between 18° and 30°, with a difference of inclination between the cords of the two strips, ranging between 3° and 15°.

DESCRIPTION

The present invention refers to tires for vehicles wheels and more particularly tires to be used on motor-cycles.

These types of tires have a very particular structure capable to support conditions of use completely different from those under which the conventional tires for motor-vehicles are used: for instance, they must be able to run also with angles of camber of very high value, of about 50° against the usual value of 3° or 4° of tires for motor-vehicles.

For this reason, the tires to be used for motor-cycles have a very winding tread-band, i.e. provided with a strong curvature on the top contrary to what happens for other tires where the tread-band as viewed in cross section is only slightly curved and becomes as flat as possible by the decreasing of the ratio height of section/width, which is well known to the technicians as ratio H/C.

Furthermore, the tires for motor-cycles must have the best performance as to steering ability, transversal stability and minimum sensibility to road unevenness, due to the instability of two-wheeled vehicle in comparison with the four-wheeled vehicle.

By way of example such tires must not develop high thrusts of drift during running on a straightaway, as such thrusts, as not balanced by those of a twin tire mounted on the same axis, as in the case of four-wheeled vehicles, would provoke an uneven running of the motor-vehicle and b dangerous for the driver.

Recently, due to the coming of faster and lighter motor-cycles, tires for motor-cycles and specifically those mounted on the front wheel, shows a dangerous behaviour, known to the technicians as "kick-back"; in other words, the front tire, when it encounters-at high speed-an obstacle even of small dimensions (joints, slight prominence of the road-bed, etc)transmits to the fork of the vehicle an impulse force which presents some components which are directed in a different manner with respect to the axis of the fork and so of the shock absorber system; for this reason, it transmits to the crank and consequently to the arms of the driver a sudden blow, more or less violent, which can cause the side-skid or even the fall of the vehicle together with the driver, with all the unlucky consequences which could be expected.

The Applicant has understood that such a behaviour is connected to the strong longitudinal stiffness and of the drift of the belt structure of the conventional tires which, at the above mentioned speeds, makes the tire substantially rigid and unable to absorb the road unevennesses, then gradually restituting the absorbed elastic energy during the impact with said unevennesses.

The present invention aims at providing a belt structure which permits elimination of the above mentioned draw-back ensuring both to the tire and to the vehicle, greater safety and reliability even at high speeds.

Accordingly, the subject matter of the present invention is a tire for wheels of motor-cycles, having a tread band height to width ratio ranging between 0.20 and 0.35, comprising a textile carcass, a tread band on the top of said carcass, sidewalls and beads for the anchorage of said tire on a corresponding assembling rim, and a reinforcing annular structure inserted between said carcass and said tread band, comprising two strips of rubberized fabric reinforced with cords parallelly disposed in relation to each other in each strip, inclined with respect to the circumferential direction of the tire and crossed with those of the adjacent strip, characterized by the fact that said reinforcing annular structure comprises in a radially inner position a first strip of reinforcing cords inclined according to an angle ranging between 22° and 35° and in a radially outer position a second strip of reinforcing cords, having a modulus lower than that of the cords of said first strip, inclined according to an angle having a lower value with respect to that of the cords of said first strip, ranging between 18° and 30°, the inclination difference among the cords of said strips ranging between 3° and 15°, said angles of inclination being measured on the top of the vulcanized tire, at its equatorial plane.

Preferably, the materials used for the cords of said first strip are those choosen inside the group comprising steel, aramide or, rayon, while the cords of said second strip are preferably polyamide, polyester or the already cited rayon.

Figure 2:
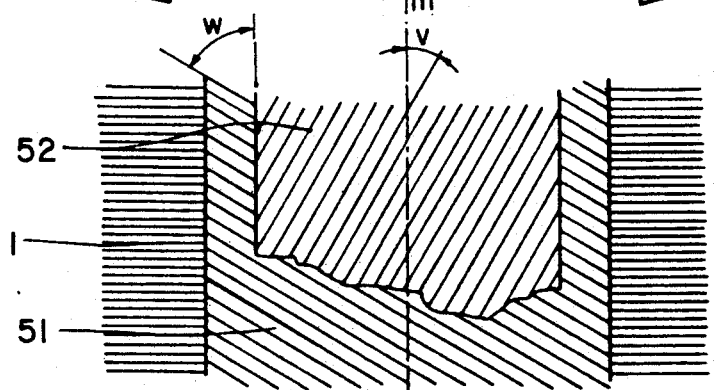

The present invention will be better understood from the following detailed description, given only by way of non-limiting example and made with reference to the attached sheets of drawings, in which:

FIG. 1—illustrates a straight section of the tire according to the invention in a plane containing the rotation axis of the tire;

FIG. 2—illustrates a preferred embodiment of the belt structure of the tire according to the invention.

Figure 3:
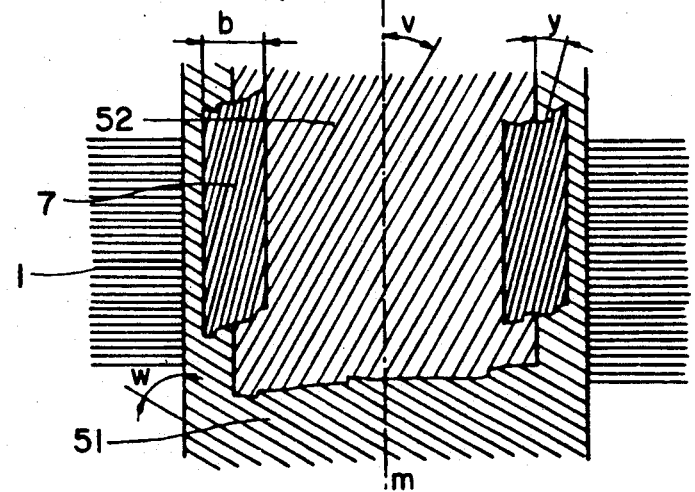

FIG. 3—illustrates an alternative embodiment of the belt structure according to the invention.

With reference to FIG. 1, it must be observed that the tire of the invention consists of a carcass 1 constructed with one or more plies (generally two), having an straight shaped section, according to an arrangement wherein the ends are turned-up: all this is, on the other hand, carried out in a conventional manner, around two annular metal cores 2, provided-in their radially outer position-with a filling or apex of 3 elastomeric material of appropriate rheometric characteristics.

On the top of said carcass there is a tread band 4 and an annular reinforcing structure 5 is sandwiched between the tread band and the carcass.

In particular, the annular structure according to the invention comprises a first strip 51 of rubberized fabric in the radially inner position and a second strip of rubberized fabric 52, overlapped to it, in the radially outer position.

The tire's area comprising the annular metal core 2, usually known as a bead-core, and the filling or apex 3, represents the bead of the tire, whose purpose is to ensure the anchorage of the above mentioned tire to a corresponding assembling rim, here not illustrated.

The area substantially comprised between the radially outer end of the filling or apex 3 and the end of the belt 5 takes the name of sidewall 6 of the tire and it represents the area having greater flexibility apt to ensure a comfort condition during the running of the vehicle.

The reinforcing cords of the carcass plies are of any conventional textile material already known; i.e. in the case hereabove mentioned they are of rayon, that is of synthetic fiber deriving from cellulose, and preferably they are arranged according to the radial direction: they are axially extending from one bead to the other lying on planes containing the rotation axis of the tire.

The necessary mechanical resistance of the rubberized fabric of which the said plies are constituted, is determined by an appropriate choice of the type of the cord and by the density of the cords in the fabric, approximately about 90-120 cords/dm so as to realize a fabric having a modulus not lower to 200 Kg per linear millimeter of fabric.

As can be noted from the tire shown at FIG. 1, from a quality point of view, the tires for a motor-cycle have a tread-band strongly curved, with an accentuated curvature on the top.

In particular, according to the description hereinafter, such a curvature is indicated by the value of arrow "f" that is the ratio h/1, where "h" represents the radial height of the tread-band and "1" represents the maximum width of the above mentioned tread-band, as indicated at FIG. 1.

Concerning the tire of the invention, the value "f" ranges between 0.20 and 0.35.

The exact measurement of the tread-band ends, necessary to get a reliable and real measures of 1 and h is easily obtained by virtue of the fact that the tread-band terminates with a live edge, which identifies the beginning of the side: this datum is proved particularly useful to the driver of the vehicle in order to appreciate when the maximum admittable angle of camber is achieved, during the curvilineal running direction or during drift.

The radial height "r" of such edge, with respect to the bottom line of the bead, taken as the reference line, coincides with the ends of the belt.

Now, taking into consideration the belt structure of the above mentioned tire, which is the subject matter of the present invention, such a structure (FIG. 2) comprises, proceeding from inside to outside of the tire, a first strip 51 of reinforcing cords, parallelly arranged to each other inside the strip and inclined with respect to the m—m equatorial plane according to an angle w ranging between 22° and 35°.

Adjacent on said first strip and superimposed to it, in a radially outer position, is arranged a second strip 52, of rubberized fabric reinforced with cords parallelly arranged to each other inside the strip, crossed with the cords of the lower strip 51, and inclined with respect to the equatorial plane of the tire according to an angle v ranging between 18° and 30°.

Among these fields of angular values, the difference between the value of v and that of w is always ranging between a minimum of 3° and a maximum of 15°, with "v" being the angle having the lesser value.

According to the invention. the cords of the first strip 51 are of high modulus material: appropriate materials for this use are, for instance, steel, synthetic fibers of aromatic polyamide, or aramide (a type of these synthetic fibers is better known on the market as "Kevlar", a registered trade mark of Du Pont), or the synthetic fibers of cellulose, generally known as rayon.

Contrarily, the cords of the second strip 52 are conveniently of low modulus material: for this use, appropriate materials are the already mentioned rayon, the synthetic fibers of polyester, the synthetic fibers of aliphatic polyamide generally known as nylon.

In particular, as regards the cited materials, the following values (Kg/mm$^2$) of the elasticity modulus can be given:

| | |
|---|---|
| steel | 21000 |
| aramide | 6000 |
| standard viscose (rayon) | 1800 |
| polyamide (nylon) | from 200 to 800 |
| polyester | from 560 to 1000 |

It will be anyhow clear that previous considerations regarding high and low modulus are referred not only to the absolute value of such a modulus but, above all, to the relative value between the modulii of the two types of cords utilized in the layers: for instance, rayon in combination with nylon or polyester must be considered a high modulus fiber; on the contrary, in combination with steel or aromatic polyamide is surely a low modulus material.

Among the cited materials, those preferred by the Applicant are those of aramide fibers as regards the cords of the strip 51 and of nylon as regards the cords of strip 52; the preferred values for inclination angles choosen by the Applicant are of 25°±1° (24°-26°) for the high modulus cords and of 22°±1° (21°-23°) for the low modulus cords.

As to the cited angular values, it must be said that they are intentionally measured on the top of the vulcanized tire, at the equatorial plane (mid-circumferential line).

As a matter of fact, to determine the angle value of the cords in any other area, particularly at the extremity of the belt structure on the vulcanized tire would be neither easy nor certain.

With reference to the present invention, also the density of the cords in the two belt strips represents an important characteristic particularly in connection with the behaviour of the tire in use.

Such a density will however be appropriately lower than that usually utilized in the known structures: for instance as far as strip 51 is concerned, the Applicant has found it convenient to utilize a density of 70 cords/dm, without anyhow exceeding the value of 80 cords/dm.

The cords' density of strip 52 is then conveniently lesser than the density of the cords of strip 51: in particular the difference between such values of density will not be less than 5 cords/dm.

The belt structure now described can be reinforced further on (FIG. 3) with two lateral bands 7 of rubberized fabric reinforced with low modulus cords arranged in the radially outer position on the ends of the lower couple of strips 51 and 52.

The width "b" of each band is appropriately ranging between 5% and 15% of the overall width, measured along its own peripheral length, of the belt package with the cords of said bands inclined in the same direction, in respect to the circumferential direction of the tire, of those of radially outer strip 51.

The inclination of said cords can vary between 15° and 25°; they are, preferably, parallel to those of the said outer strip, anyhow, also a small angular difference between the two inclination is acceptable. In this case the difference between the value of the inclination angle "y" of the band's cords and that of the angle "v" of the cords of the radially outer strip does not exceed the value of 6°, the cords's angle of the bands being preferably that of the lesser value.

At last, it is advisable to put into evidence that both the position of the belt strips and the carcass type of the tire are rather important in relation to the present invention.

As regards the reciprocal position among the breaker belt layers, it is thought advisable to arrange the strip of the low modulus cords in radially inner position and the strip of high modulus cords in radially outer position.

On the other hand, it must be taken into consideration that, when the tire meets an obstacle during its running, the breaker belt suffers localized deformations that may provoke compression stresses on the strips cords.

The stresses caused by such deformations are obviously stronger with the increase of the distance from the neutral axis of flexion of the belts package and, such neutral axis, due to the strong curvature of the tread-band, is always in the radially inner position with respect to the strip of the belt radially innermost.

It happens that, arranging the high modulus strips in the radially outer position together with the belt structure, they are subjected to stronger stresses: in fact the high modulus cords and specifically those of aramide, posses a smaller resistance than those of low modulus in respect to stresses to fatigue and so must be put as near as possible to the neutral axis and so in radially inner position; the opposite arrangement produces structures having lesser resistance to fatigue and thus tires having shorter life.

As concerns the carcass type adopted, it must be pointed out that the problem faced and solved by the present invention is that of belt structure with lesser longitudinal stiffness and of drift with respect to the known structure: it is obvious that a carcass having crossed plies holds a longitudinal stiffness on the top which partially cancels the advantages achieved by the structure of the invention, so the preferred matching of the belt structure according to the invention is that of a radial type carcass.

As already hinted, the belt according to the invention has successfully solved the problem faced, in particular that of "kick-back": the use of two strips of cords having differentiated modulii and densities and inclination angles of the cords greater than those usual, has originated a belt that—although maintaining a strong belting effect—has a low longitudinal stiffness and consequently a strong capacity of absorbing impacts and localized deformations without transmitting dangerous impulses to the fork of the vehicle.

Furthermore, the geometrical characteristics of the structure, in particular with a critical delimitation of the angular values of inclination of the reinforcing cords, enables construction of a tire which offers a dynamic behaviour, absolutely uniform, unable to generate in use serious anomalous thrusts in particular of drift (the low longitudinal stiffness implies also a lesser stiffness of drift); in such a situation the tire has a strong directional capacity and high transversal stability.

Lastly, it is advisable to point out that the tire of the invention is specifically designed to be mounted on the front-wheel of the motor-cycle: as a matter of fact, as far as the rear wheel is concerned, although from a side the phenomenon of kick-back does not exist thanks to the the mechanical properties of the vehicle (by virtue of this all the impulses transmitted from the road to the tire are absorbed by the shock-absorber system of the motor-cycle), while—on the other hand—are preferred tires with a very strong belting capacity and also with high longitudinal stiffness, in order to develop very high running speed (up to 280 Km/hour) previously indicated.

It is understood that the purpose of the present specification is purely illustrative and not restrictive, so that the invention will include in its scope any modification or alternative embodiment not expressely described but easily deducible, from the above indicated inventive idea.

I claim:

1. A motor-cycle tire comprising:
   a pair of beads at the sides of the tire for anchoring said tire to a corresponding wheel rim;
   a textile carcass extending between the beads and secured thereto;
   a tread-band radially outward of said carcass and having an arcuate cross-section whose height to width ratio has a value ranging between 0.20 and 0.35;
   a pair of sidewalls defined substantially between the radially outer ends of the beads and the ends of the tread-band;
   an annular reinforcing structure positioned between said carcass and said tread-band, and having a first strip of rubberized fabric reinforced with cords parallelly arranged with respect to each other and having a density in the range of 70-80 cords/dm and inclined at an angle ranging between 22° and 35° to the equatorial tire plane,
   a second strip of rubberized fabric laid upon the first strip in a radially outer position with respect to the first strip and reinforced with cords parallelly arranged with respect to each other and having a density of less than the density of the cords of said first strip, the cords of the second strip having an elasticity modulus lower than the elasticity modulus of the cords of said first strip and being inclined in the opposite direction with respect to the cords of the first strip and at an angle ranging between 18° and 30° with respect to the equatorial plane, said angle being smaller than the inclination angle of the cords of said first strip, an inclination difference between the cords of said first and second strips, with respect to said equatorial tire plane, ranging between 3° and 15°.

2. A tire according to claim 1 wherein the inclination angle of the cords of said first strip ranges between 24° and 26° and the inclination angle of the cords of said second strip ranges between 21° and 23°.

3. A tire according to claim 1 wherein the reinforcing cords of said first strip are of a material selected from the group consisting of steel, aramide, and rayon.

4. A tire according to claim 1 wherein the reinforcing cords of said second strip are of a material selected from the group consisting of rayon, polyamide, and polyester.

5. A tire according to claim 1 wherein the difference of cord density between said first and second strips is not less than to 5 cords/dm.

6. A tire according to claim 1 wherein said carcass is of the radial type.

7. A motor-cycle tire comprising:
a pair of beads at the sides of the tire for anchoring said tire to a corresponding wheel rim;
a textile carcass extending between the beads and secured thereto;
a tread-band radially outward of said carcass and having an arcuate cross-section whose height to width ratio has a value ranging between 0.20 and 0.35;
a pair of sidewalls defined substantially between the radially outer ends of the beads and the ends of the tread-band;
an annular reinforcing structure positioned between said carcass and said tread-band, and having a first strip of rubberized fabric reinforced with cords parallely arranged with respect to each other and inclined at an angle ranging between 22° and 35° to the equatorial tire plane,
a second strip of rubberized fabric laid upon the first strip in a radially outer position with respect to the first strip and reinforced with cords parallelly arranged with respect to each other, the cords of the second strip having an elasticity modulus lower than the elasticity modulus of said first strip and being inclined in an opposite direction with respect to the cords of the first strip at an angle ranging between 18° and 30° with respect to the tire equatorial plane said angle being smaller than the inclination angle of the cords of said first strip, an inclination difference between the cords of said first and second strips, with respect to said equatorial tire plane, ranging between 3° and 15°;
a pair of bands of rubberized fabric reinforced with cords laid, in a radially outer position, upon said first and second strips, the cords of said bands having a low elasticity modulus and being inclined in the same direction as the cords of said second strip, according to an angle ranging between 15° and 25° to the equatorial tire plane.

8. A tire according to claim 7 wherein the difference between the inclination value of the cords of said bands and the inclination value of the cords of said second strip does not exceed 6°.

9. A tire according to claim 7, wherein said carcass is of the radial type.

* * * * *